United States Patent
Priego et al.

(10) Patent No.: US 11,218,076 B2
(45) Date of Patent: Jan. 4, 2022

(54) ULTRA-LOW IQ BUCK CONVERTER WITH SWITCHABLE ERROR AMPLIFIER

(71) Applicant: Texas Instruments Incorporated, Dallas, TX (US)

(72) Inventors: Antonio Priego, Freising (DE); Johann Erich Bayer, Thonhausen (DE); Gerhard Thiele, Dachau (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 67 days.

(21) Appl. No.: 16/558,079

(22) Filed: Aug. 31, 2019

(65) Prior Publication Data
US 2020/0127569 A1 Apr. 23, 2020

Related U.S. Application Data

(60) Provisional application No. 62/746,894, filed on Oct. 17, 2018.

(51) Int. Cl.
*H02M 3/158* (2006.01)
*H02M 1/00* (2006.01)

(52) U.S. Cl.
CPC .......... *H02M 3/158* (2013.01); *H02M 1/0032* (2021.05)

(58) Field of Classification Search
CPC . H02M 2001/0032; H02M 2001/0035; H02M 3/156–1588; H02M 1/0032; H02M 1/0035
See application file for complete search history.

(56) References Cited

U.S. PATENT DOCUMENTS

| | | | | |
|---|---|---|---|---|
| 5,617,016 A * | 4/1997 | Borghi | ................ | H02M 3/1563 323/284 |
| 5,770,940 A * | 6/1998 | Goder | .................... | G05F 1/565 323/282 |
| 6,127,815 A * | 10/2000 | Wilcox | .................... | G05F 1/565 323/282 |
| 6,147,478 A * | 11/2000 | Skelton | ............... | H02M 3/1588 323/288 |
| 6,958,594 B2 * | 10/2005 | Redl | ..................... | H02M 3/156 323/282 |
| 7,030,596 B1 * | 4/2006 | Salerno | ................. | H02M 3/158 323/282 |
| 7,576,527 B1 * | 8/2009 | Zhang | ................. | H02M 3/1563 323/282 |
| 8,593,125 B1 * | 11/2013 | Xue | ...................... | H02M 3/156 323/284 |
| 9,201,438 B2 * | 12/2015 | MacLean | ............ | H02M 3/1588 |
| 9,602,001 B1 * | 3/2017 | Hung | .................... | H02M 3/158 |

(Continued)

*Primary Examiner* — Fred E Finch, III
(74) *Attorney, Agent, or Firm* — Ray A. King; Charles A. Brill; Frank D. Cimino

(57) ABSTRACT

A switching converter circuit includes a hysteretic comparator with a reference voltage (VREF) node and a feedback node. The switching converter circuit also includes a switchable error amplifier circuit coupled to the feedback node of the hysteretic comparator. The switchable error amplifier circuit includes an error amplifier that is coupled to the feedback node during a power-save mode and that is decoupled from the feedback node during a deep power-save mode initiated in response to a duration of the power-save mode being greater than a time threshold.

21 Claims, 14 Drawing Sheets

(56) References Cited

U.S. PATENT DOCUMENTS

| | | | | |
|---|---|---|---|---|
| 2003/0222629 | A1* | 12/2003 | Inoue | H02M 3/1588 |
| | | | | 323/224 |
| 2003/0231012 | A1* | 12/2003 | Corva | H02M 3/156 |
| | | | | 323/285 |
| 2007/0114986 | A1* | 5/2007 | Yoshii | H02M 3/1588 |
| | | | | 323/288 |
| 2009/0153124 | A1* | 6/2009 | Ishii | H02M 3/156 |
| | | | | 323/290 |
| 2009/0200997 | A1* | 8/2009 | Yang | H02M 3/156 |
| | | | | 323/234 |
| 2010/0308784 | A1* | 12/2010 | Scoones | H02M 3/157 |
| | | | | 323/282 |
| 2011/0062926 | A1* | 3/2011 | Qiu | H02M 3/1588 |
| | | | | 323/282 |
| 2012/0161728 | A1* | 6/2012 | Chen | H02M 3/1563 |
| | | | | 323/271 |
| 2018/0131273 | A1* | 5/2018 | de Cremoux | H02M 3/156 |
| 2020/0106360 | A1* | 4/2020 | Priego | H02M 3/1582 |
| 2020/0127570 | A1* | 4/2020 | Thiele | H02M 3/158 |

* cited by examiner

ULTRA-LOW IQ BUCK CONVERTER WITH SWITCHABLE ERROR AMPLIFIER

CROSS-REFERENCE TO RELATED APPLICATIONS

This application claims priority to U.S. Provisional Application No. 62/746,894, filed Oct. 17, 2018, which is hereby incorporated by reference.

BACKGROUND

Internet-of-Things (IoT) opens up a countless of new possibilities in fast growing markets for example building automation, grid infrastructure and wearables. In the case of battery powered IoT, the system sits idle for the vast majority of the time (sleep mode) drawing currents in the order of microamps from the battery, to meet a 10-year+ battery life (primary cell) or significantly extending recharge (secondary cell) cycles. On the other hand, peak currents of several hundreds of milliamps are demanded when the system wakes up and runs, during short times, in active mode (for instance radio communication in IoT or motor drivers in smart locks).

FIG. 1 shows a buck converter topology for ultra-low Iq battery power applications; a hysteretic-based switching regulator. An internal reference (VREF) connects to the positive input of a hysteretic comparator. The hysteretic comparator is the only active component in the loop and ensures output voltage regulation by comparing its negative input FB against VREF. The output of the comparator (FB_COMP) is connected to a power stage. The power stage consists of a gate driver and power switches S1 and S2. Power switches S1 an S2 are integrated in the IC or, in the case of a controller, are external. The hysteretic comparator controls directly the on/off state of power switches S1 and S2, resulting in a PWM signal at SW node. Lout/Cout low-pass filter removes the high frequency contents of the PWM signal resulting in the regulated fixed output voltage VOUT. Rload represents the load connected to the switching regulator.

As shown in FIG. 1, a first feedback loop is formed by a resistor Rbias connected between the negative input of a comparator and the converter output voltage VOUT. This feedback loop is responsible for DC voltage regulation of the converter output voltage. A second feedback loop is formed by a) a resistor Raux connected between an internal node FB_INT and a node SW between power switches S1 and S2 of the DC to DC converter and b) a capacitor Caux coupled between the node FB_INT and the node VOUT. The low pass filtering of the voltage at the node SW with the time constant Raux/Caux generates a regulation ramp signal at node FB_INT. The regulation ramp generated at FB_INT is ac coupled to the negative input of the comparator through capacitor Cac. Two signals are then summed at the negative input of the comparator: one being the ramp signal generated by the Raux/Caux circuitry, and the other being the average DC voltage at node VOUT generated by the output of the converter.

A well-known problem of hysteretic voltage regulators is the reduced output voltage accuracy: The hysteretic comparator turns switch S1 on when FB voltage (VOUT+regulation ripple or ramp) falls to VREF and turns switch S2 on and when the FB voltage exceeds VREF+comparator hysteresis. As shown in FIG. 2, the voltage ripple at node FB increases when the power switch S1 is turned on and the voltage ripple at node FB decreases when power switch S2 is turned on. Neglecting second order effects, the resulting waveform at node FB is a triangular waveform (regulation ramp) with amplitude equal to the comparator hysteresis and average value equal to the average DC voltage at node VOUT. The average DC voltage at node VOUT should equal the internal reference VREF. However the voltage ripple on the feedback (FB) node is regulated so that the valley of the voltage ripple sits at the reference voltage level VREF. The ripple voltage component causes that the average DC voltage at node FB, and consequently the average DC voltage at node VOUT, is offset from the reference voltage VREF by a value equal to Vhysteresis/2, degrading the output signal accuracy.

Neglecting second order effects, switching period Tsw of the hysteretic-based regulator depends on comparator hysteresis, time constant Raux/Caux and duty cycle (VOUT/VIN). The dependency of switching frequency with duty cycle is in some applications not desirable. Several modifications to the basic topology in FIG. 1 exist in the industry to reduce this switching frequency dependency, being the constant-on time switching regulator (COT) in FIG. 3 one of them.

In FIG. 3, a) the comparator is a non-hysteretic comparator and b) an additional circuitry, a TON timer, has been added. The comparator outputs a short pulse when FB voltage (VOUT+regulation ripple) falls to VREF. This pulse turns the power switch S1 on and initiates a TON timer that determines the duration of S1 turn on. When TON timer expires, switch S2 is turned on. FIG. 4 shows the resulting waveform and illustrates that independently of the means used to compensate switching frequency variation, these hysteretic-base switching regulators with more stable switching frequency still suffer from reduced output voltage accuracy.

SUMMARY

The invention combines the benefits of the hysteretic-based converter with the output voltage accuracy of the voltage-mode converter. The disclosed topology includes an error amplifier that unlike prior-art topologies can be switched-off when needed maintaining at light loads the characteristic ultra-low Iq performance of the hysteretic-bases converter. Therefore, the different embodiments of the new ultra-low Iq buck converter topology provide benefits, including: 1) switching converter quiescent currents below 100 nA in a deep power-save mode, which significantly improves battery lifetime in ultra-low power systems; 2) support of high load currents in active mode; and 3) support of very low output capacitances. The new ultra-low Iq buck converter topology allows automatic transitions from power-save mode to active mode as well as automatic transitions from deep power-save mode to active mode.

BRIEF DESCRIPTION OF THE DRAWINGS

For a detailed description of various examples, reference will now be made to the accompanying drawings in which.

DETAILED DESCRIPTION

Figure 1:
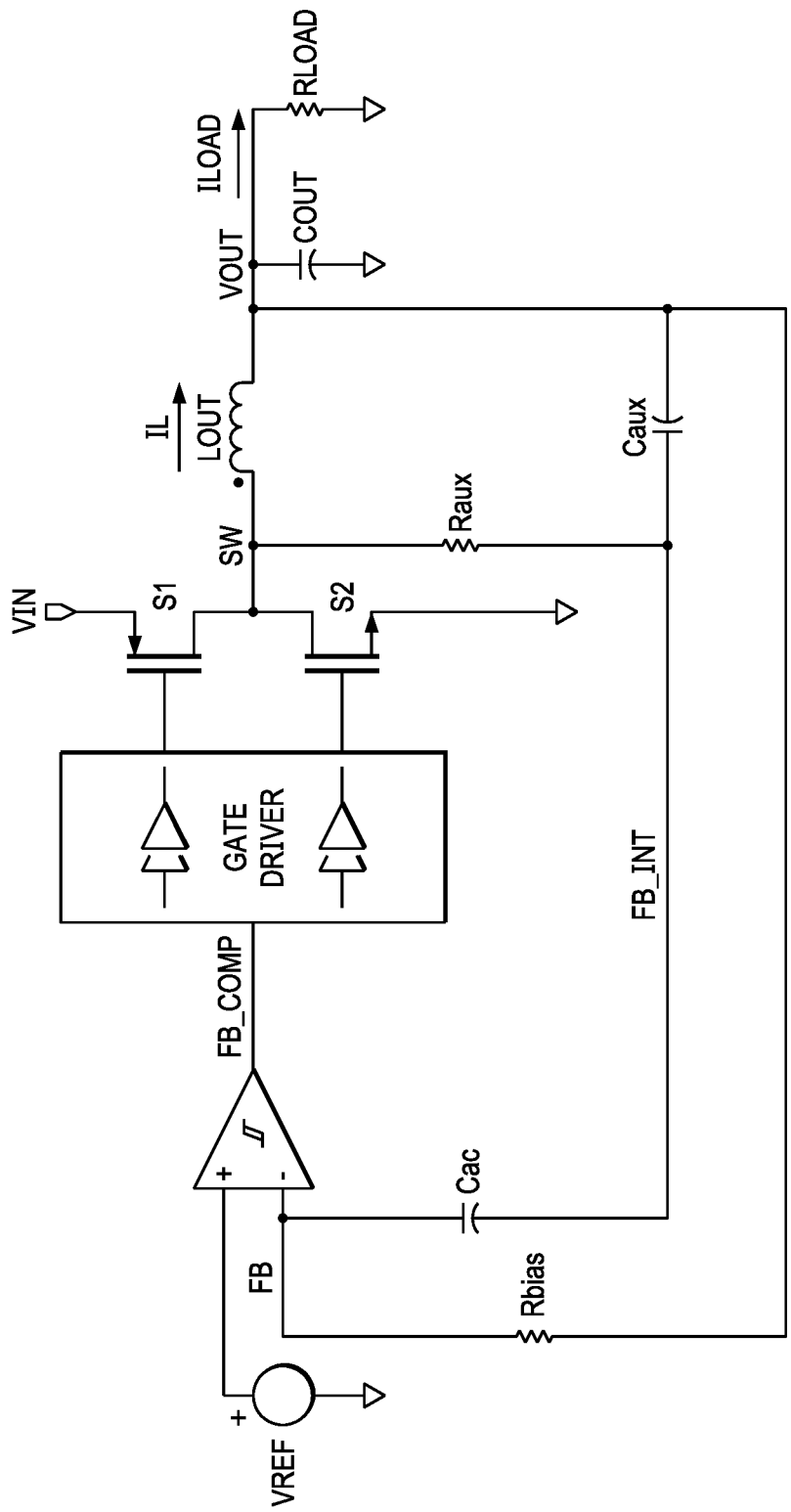
FIG. 1 is a schematic diagram of a hysteretic buck converter suitable to ultra-low applications.
Figure 2:
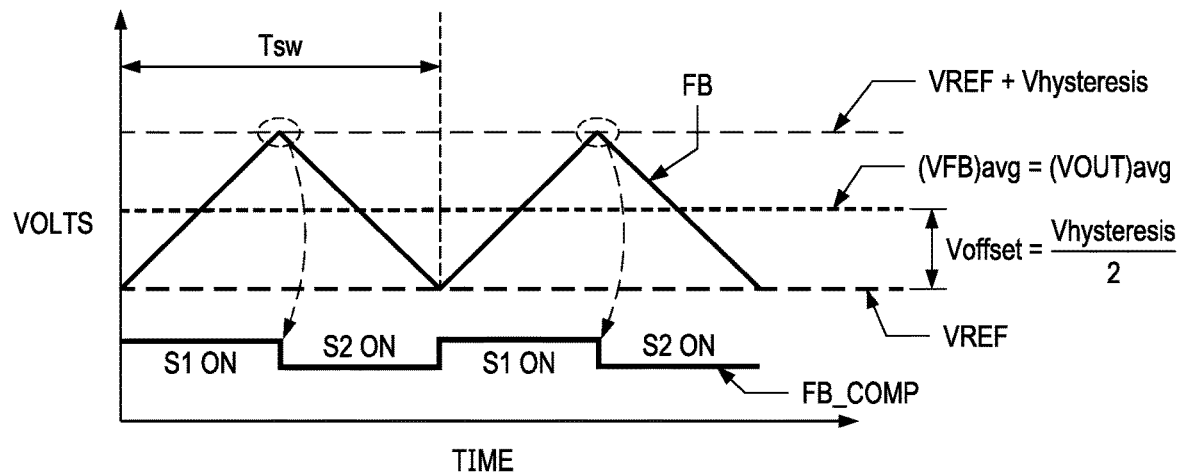
FIG. 2 is a timing diagram showing output voltage offset introduced by regulation ramp on feedback in a hysteretic-based switching regulator.
Figure 4:
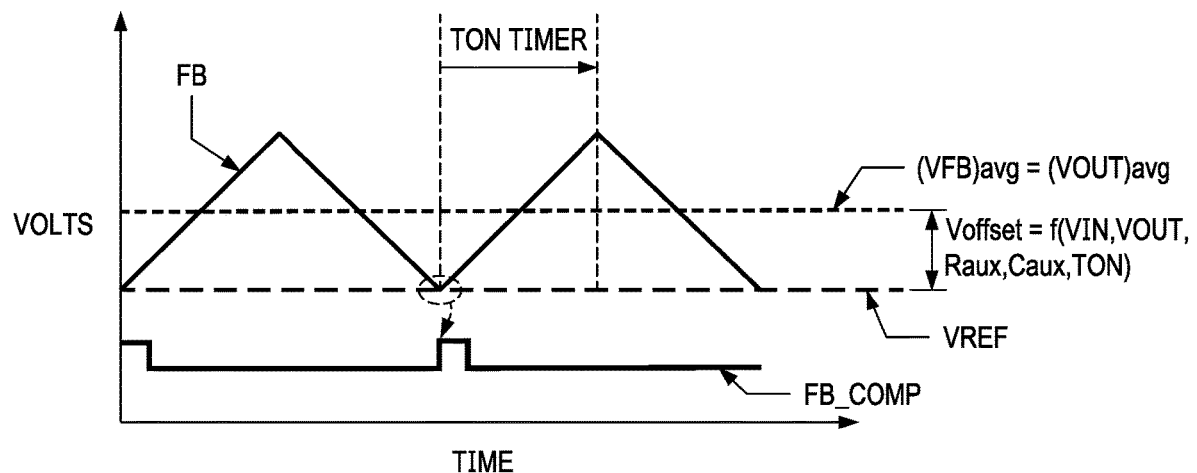
FIG. 4 is a timing diagram showing output voltage offset introduced by regulation ramp on feedback in a constant-on-time (COT) switching regulator.

Disclosed herein are new ultra-low Iq buck converter topologies with a switchable error amplifier. In accordance with disclosed examples, the switchable error amplifier is switched off to achieve a deep power-save mode. As used herein, a "deep power-save mode" refers to a mode in which switching of the power switches is paused (both Q1 and Q2 are off) and the switchable error amplifier is turned off. In contrast, as used herein, a "power-save mode" refers to a mode in which switching of the power switches is paused and the switchable error amplifier stays on. Also, as used herein, an "active" mode refers to a mode in which the power switches switch back and forth between a high-side state (Q1 on, Q2 off) and a low-side state (Q2 on, Q1 off) without pause. Representations of new ultra-low Iq buck converter topologies and related waveforms are provided in FIGS. 9-15. Also, FIGS. 5-8 include a description of ultra-low Iq buck converters, power-save modes, and/or other related information. In the new ultra-low Iq buck converter topologies, the error amplifier is coupled to the feedback (FB) node of a hysteretic comparator (part of a converter's voltage regulation loop) via a switch. The switch is controlled by a monitoring circuit configured to identify when the converter output voltage error, induced by the regulation ramp, exceeds a certain limit. Under this condition, the error amplifier is powered up and the switch turned on. The output error induced by the regulation ramp is related to the duration of a PAUSE signal. Consequently, in some examples, the monitoring circuit detects when the duration of the PAUSE signal associated with the power-save mode is greater than a time threshold. In response to detecting that the duration of the PAUSE signal is greater than the time threshold, the monitoring circuit asserts a control signal to switch off the error amplifier (initiating the deep power-save mode).

In order to maintain high energy efficiency at medium and low load currents, DC-DC switching regulators in general and ultra-low-Iq DC-DC switching regulators in particular operate in power-save mode. In power-save mode, high efficiency is achieved by a) avoiding inductor current reversal that would discharge the output capacitor Cout and b) skipping switching pulses, reducing in that way switching losses which are the main power losses in the load current range from several milliamps to hundreds of microamps. Additionally, at load current ranges of several microamps, it is the quiescent current of the converter what dominates the power losses. In ultra-low current applications operating most of the time in sleep mode with a total load current of only some microamps, quiescent currents of less than 100 nA in the DC-DC switching regulator supplying such a system suppose a key advantage in terms of energy efficiency. In order to achieve such a low quiescent, the number active components in the switching regulator in power-save mode must be minimal. The hysteretic-based switching regulator as in FIG. 1 with a single active device, the hysteretic comparator, is then a good option for ultra-low Iq applications.

Figure 3:
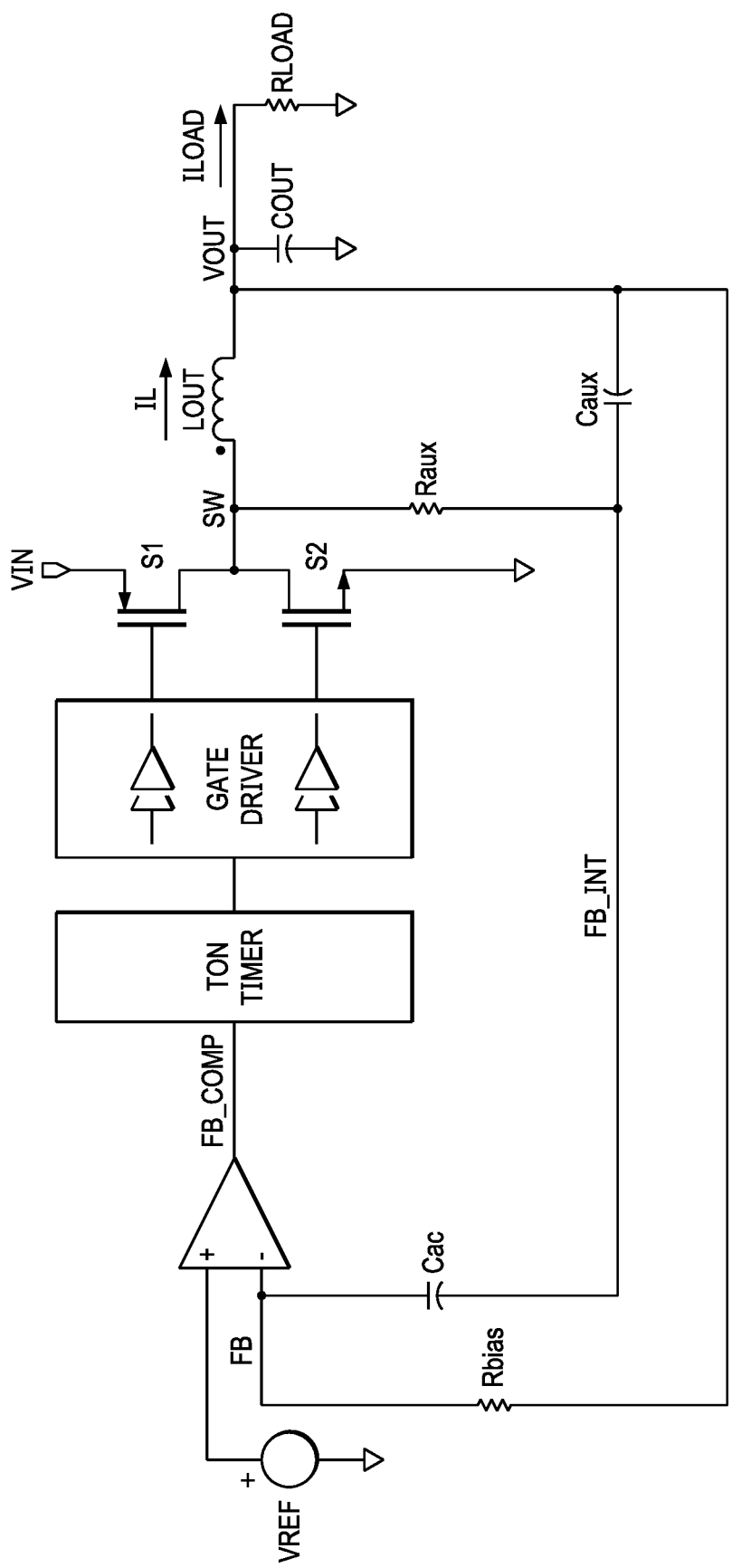
FIG. 3 is a schematic diagram of a constant-on time switching regulator (COT) topology.
Figure 5:
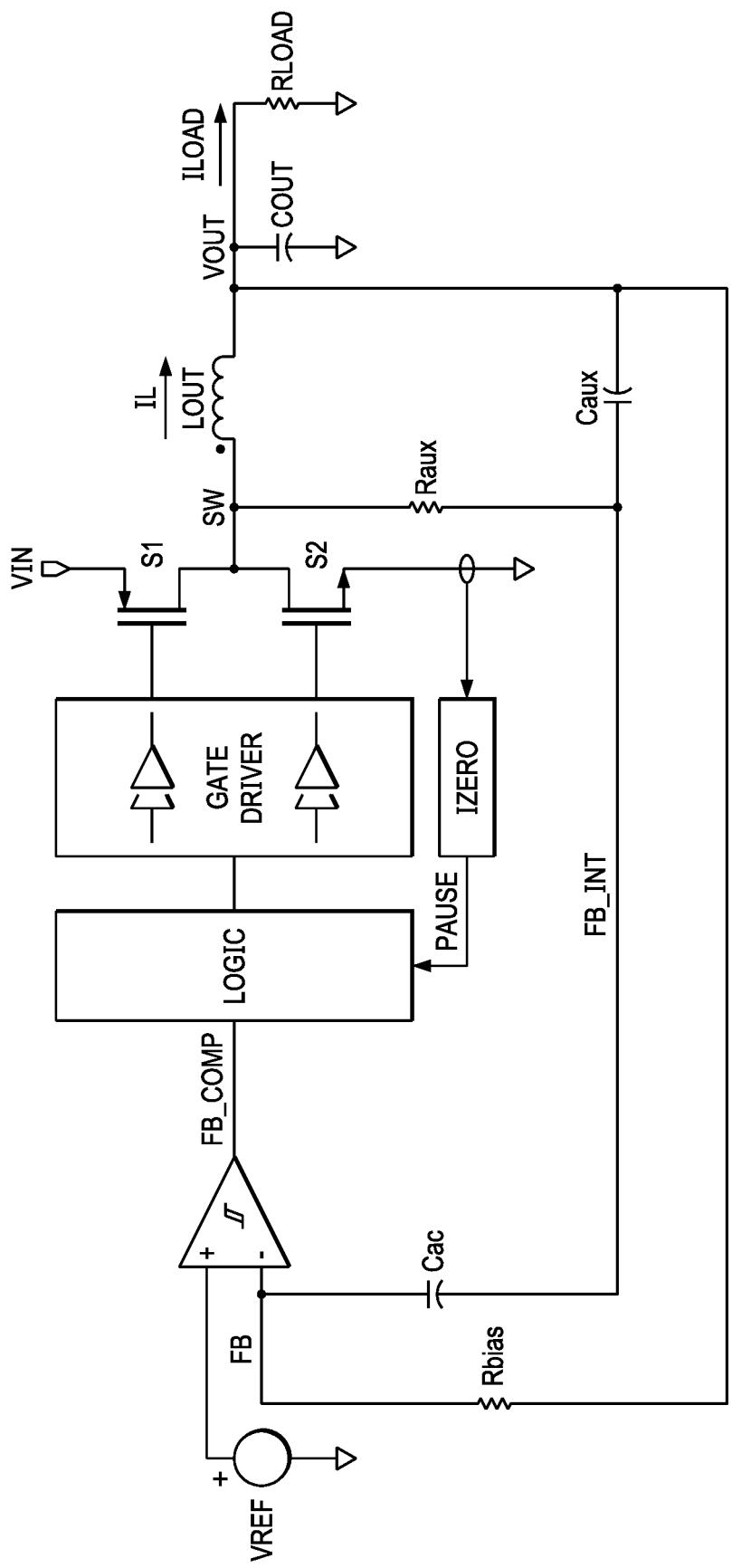
FIG. 5 is a schematic diagram of a hysteretic-based switching converter with a power-save mode.

A further advantage of the hysteretic-based switching regulators in FIG. 1 and FIG. 3 is the ease of building a power-save mode by the simple addition of an inductor current reversal detector (IZERO) and some logic (FIG. 5). IZERO is an additional active component, but it is not used in power-save mode and can be then powered down when the device stops switching. Then, the switching regulator in FIG. 5 still uses a single active device in power-save mode, the hysteretic comparator.

Figure 6:
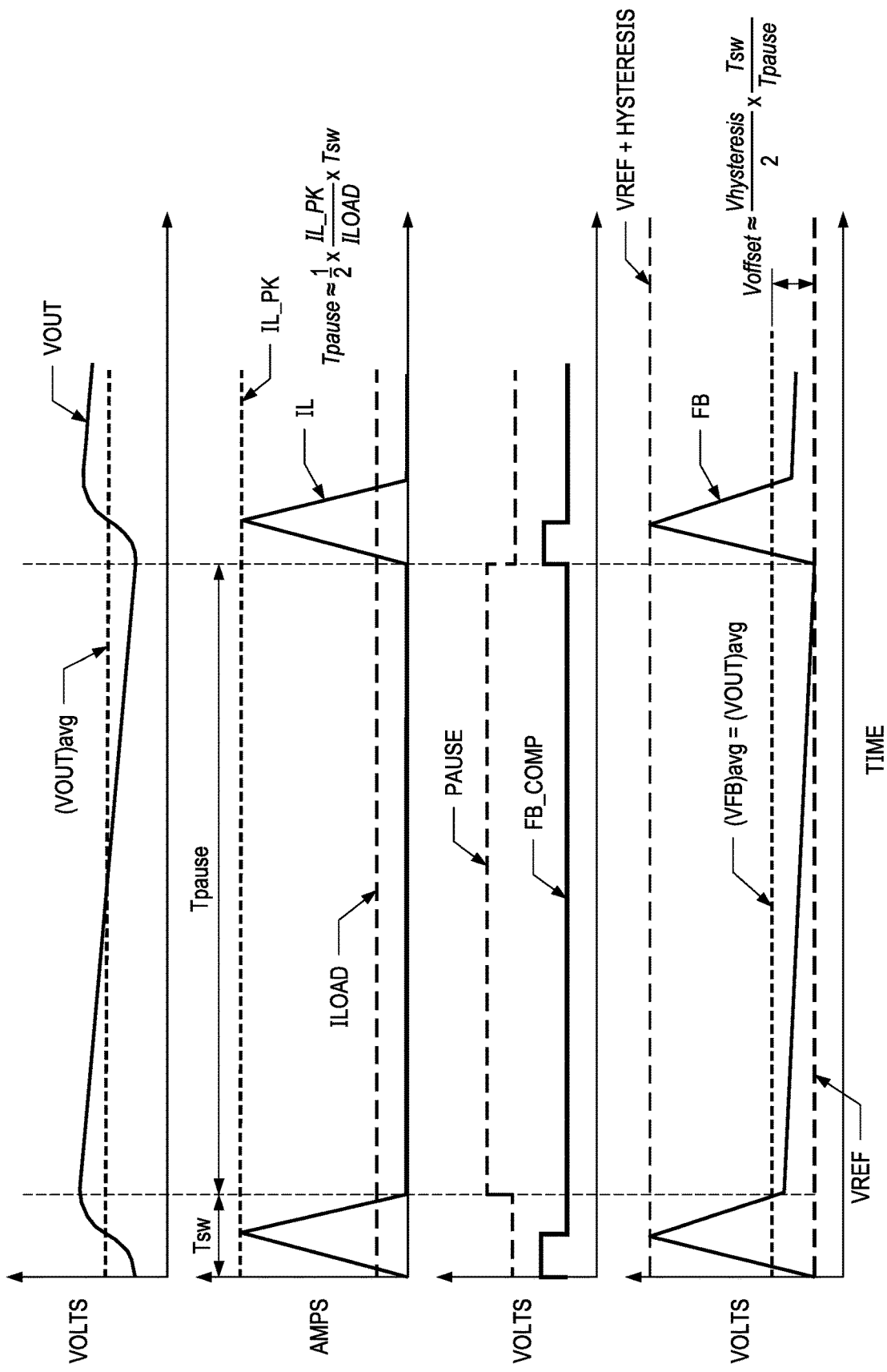
FIG. 6 is a timing diagram showing voltage waveforms of the switching converter of FIG. 5 illustrating the output voltage offset induced by the regulation ramp in power-save mode.

FIG. 6 shows regulator waveforms in power-save mode. Voltage at FB node continues being the sum of two signals: one being the ramp signal generated by the Raux/Caux circuitry, and the other being the signal at node VOUT generated by the output of the converter.

Referring to FIG. 5, the comparator turns switch S1 on when FB voltage (VOUT+regulation ripple) falls to VREF and turns switch S2 on when the FB voltage exceeds VREF+comparator hysteresis. The switching pulse charges the output capacitor COUT and as result the voltage at node VOUT raises. At low/mid load currents the inductor current reaches zero before voltage at FB node falls to VREF. The inductor zero-current comparator detects this situation and, in order to avoid unnecessary discharge of the output capacitor turns power switch S2 off. The regulator enters power-save mode (PAUSE=1) and stops switching. The regulator waits a time $T_{PAUSE}$ in the power-save condition until the comparator detects that the voltage at FB node has decreased again to its set point VREF and then initiates a new switching cycle.

As in active mode, where $T_{PAUSE}=0$, the regulation ramp introduces an offset at the output voltage VOUT but the difference in power-save mode is that the offset gets averaged out over the period $T_{PAUSE}$:

$$V_{OFFSET}(T_{PAUSE}) = \frac{V_{HYSTERESIS}}{2} \times \frac{T_{SW}}{T_{SW} + T_{PAUSE}}$$

Offset is maximum and equal to the value previously given at $T_{PAUSE}=0$, i.e. in active mode:

$$V_{OFFSET\_ACTIVE\_MODE} = \frac{V_{HYSTERESIS}}{2}$$

At very light loads, where $T_{PAUSE} \gg T_{SW}$, $V_{OFFSET}$ equation can be simplified:

$$V_{OFFSET}(T_{PAUSE}) \approx \frac{V_{HYSTERESIS}}{2} \times \frac{T_{SW}}{T_{PAUSE}}$$

The longer the PAUSE duration $T_{PAUSE}$ the lower the offset $V_{OFFSET}$. Average output current of the regulator is equal to the load current $I_{LOAD}$.

$$I_{LOAD} \approx \frac{I_{L\_PK}}{2} \times \frac{T_{SW}}{T_{PAUSE}}$$

The power-save mode duration, $T_{PAUSE}$, depends on the ratio energy per switching cycle $½ \times I_{L\_PK} \times T_{SW}$ to load current $I_{LOAD}$:

$$T_{PAUSE}(I_{LOAD}) = \frac{1}{2} \times \frac{I_{L\_PK}}{I_{LOAD}} \times T_{SW}$$

The lower the load current $I_{LOAD}$, the longer is the duration of PAUSE $T_{PAUSE}$.
Substituting $T_{PAUSE}$ into $V_{OFFSET}$ equation:

$$V_{OFFSET}(I_{LOAD}) \approx V_{HYSTERESIS} \times \frac{I_{LOAD}}{I_{L\_PK}}$$

The lower the load current $I_{LOAD}$ the lower the offset $V_{OFFSET}$ caused by the regulation ramp.

Figure 7:
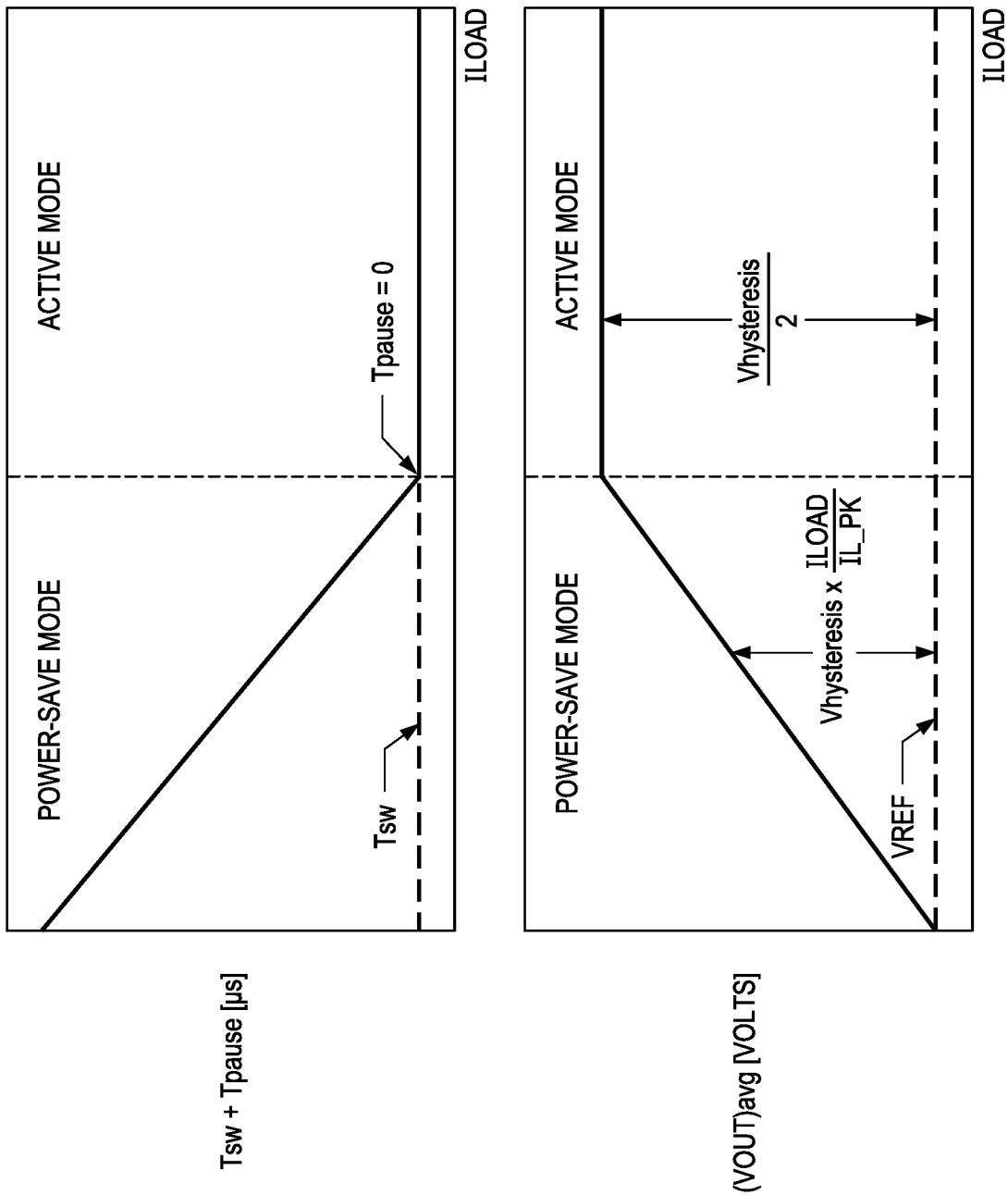
FIG. 7 is a graph showing average output voltage (VOUT) versus load current (ILOAD) characteristic of a hysteretic-based DC-DC switching regulator.

The resulting (VOUT)avg vs. ILOAD characteristic curve of a hysteretic-based DC-DC switching regulator is shown in FIG. 7, where $$(V_{OUT})_{avg} = V_{REF} + V_{OFFSET}(I_{LOAD}).$$

Output voltage error $V_{OFFSET}$ caused by the regulation ramp rises with load current $I_{LOAD}$ to a maximum $$\frac{V_{HYSTERESIS}}{2}$$

reached at the boundary power-save to active mode. At light loads, the output voltage error caused by the regulation ramp is neglectable.

Figure 8:
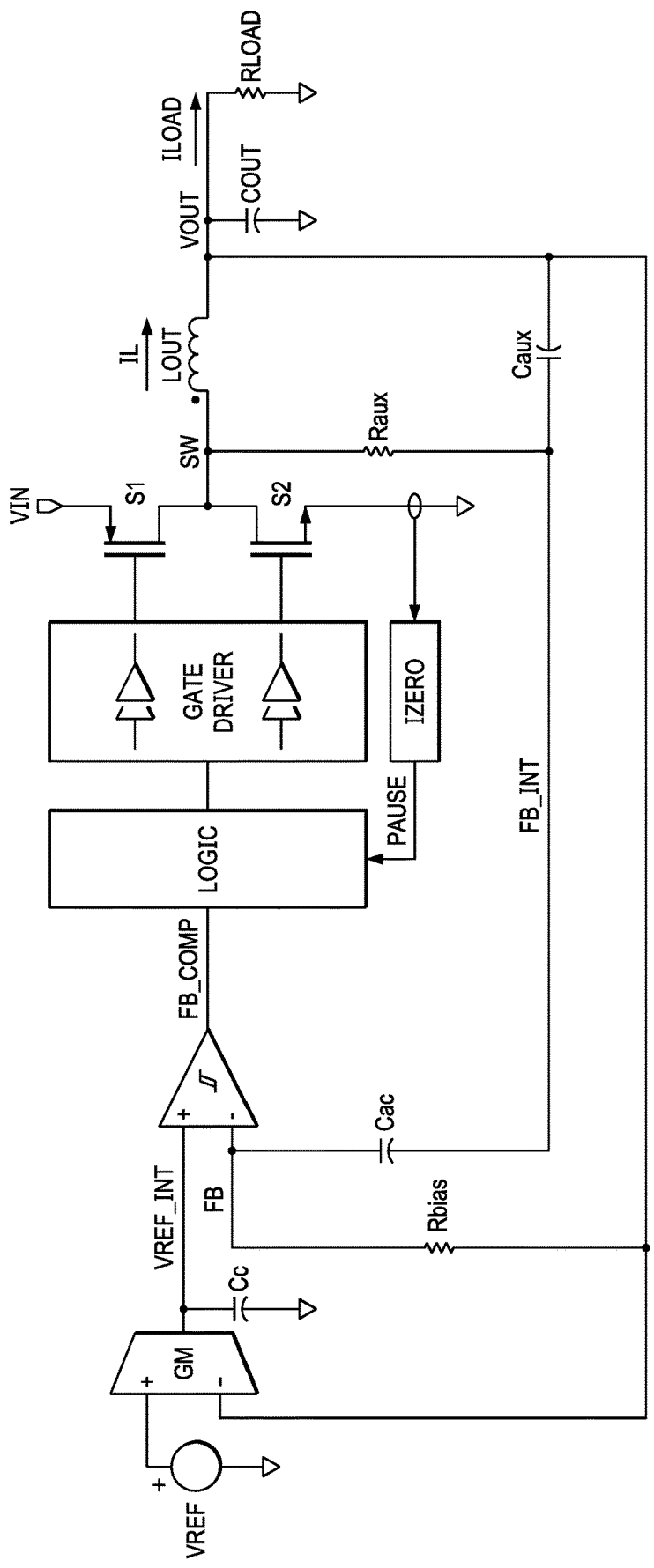
FIG. 8 is a schematic diagram of a hysteretic-based converter with compensating output voltage offset.

The maximum output voltage offset of $$\frac{V_{HYSTERESIS}}{2}$$

can be unacceptable in many applications. FIG. 8 shows another approach to compensate for the offset in hysteretic-based converters; and error amplifier (in this case represented by a transconductance amplifier Gm) adjust the comparator reference VREF_INT to compensate for the output voltage offset $V_{OFFSET}$. Compensation network around the error amplifier (Cc in this example) is necessary for stability.

One of the disadvantages of this approach compared to the pure hysteretic converter is a higher Iq used in power-save mode to ensure a proper bias of the integrator node VREF_INT and to compensate for any voltage drift that leakage could cause during long $T_{PAUSE}$. Typically, the transconductance amplifier itself is maintained always active for this purpose with the benefit that the offset correction occurs over the whole load current range. But in any case, this solution consumes additional Iq at very light loads and that is not acceptable in ultra-low Iq applications.

On the other hand, it has shown that at light loads, the output voltage error caused by the regulation ramp is neglectable. No correction is necessary under this load condition and from the output voltage accuracy point of view the transconductance amplifier can be disabled to maintain the ultra-low Iq characteristic of the hysteretic-based converter in the load current range where DCDC converter Iq impacts energy efficiency. But in order to be able of powering down the error, a solution is needed to ensure proper bias of the integration node.

Figure 9:
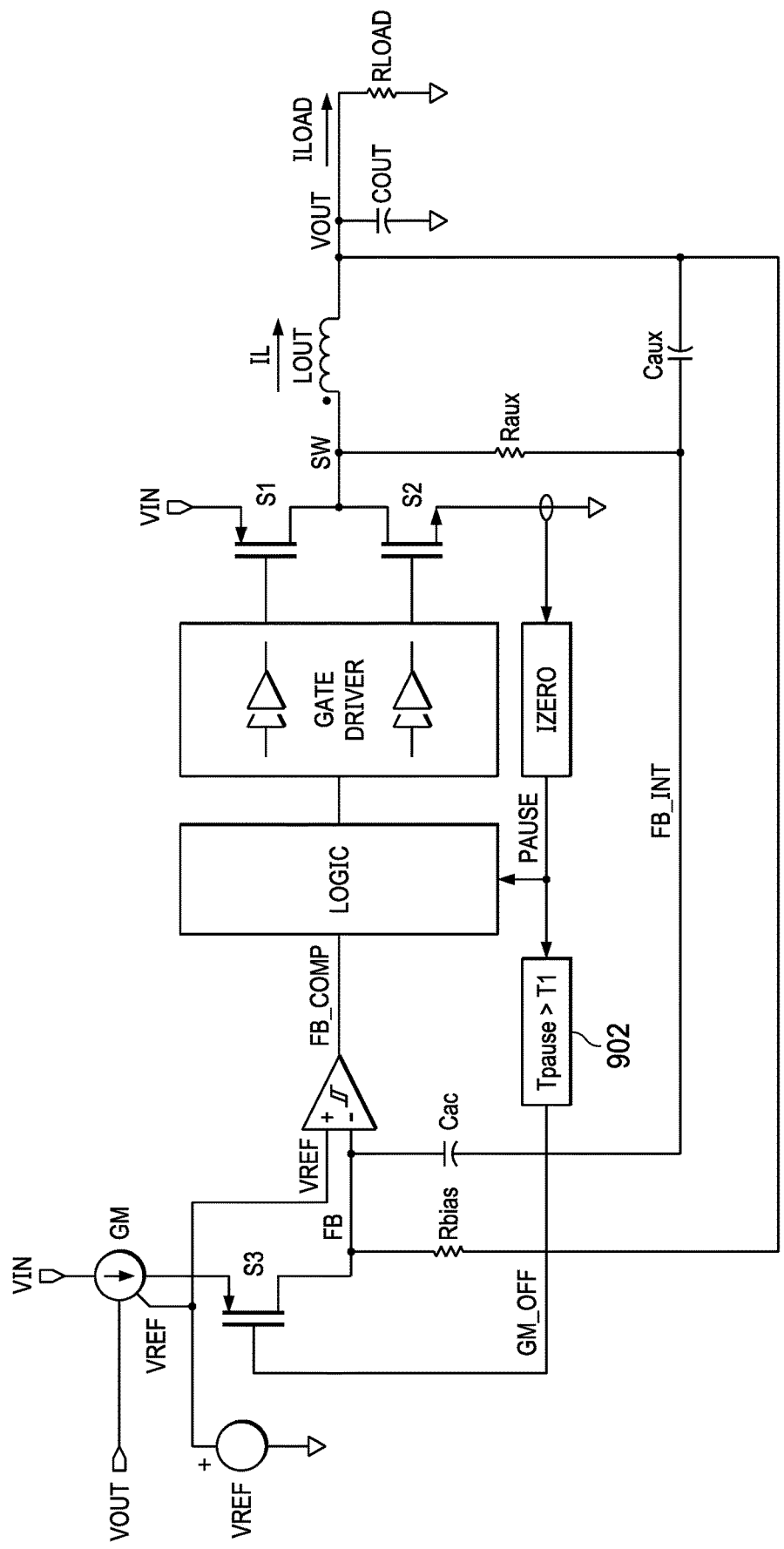
FIG. 9 is a schematic diagram of a new ultra-low Iq buck converter topology.
Figure 10:
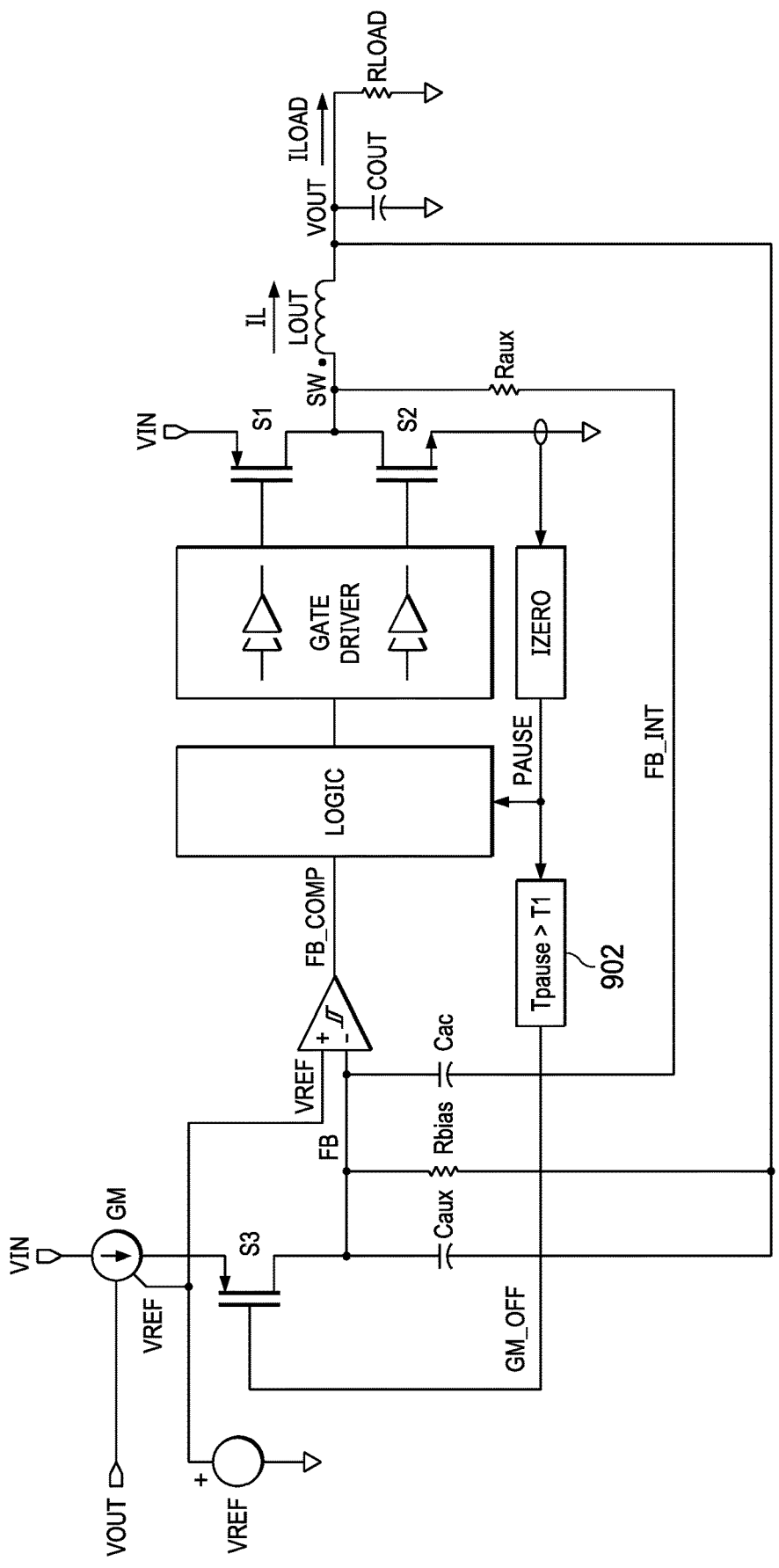
FIG. 10 is a schematic diagram of another new ultra-low Iq buck converter topology.
Figure 11:
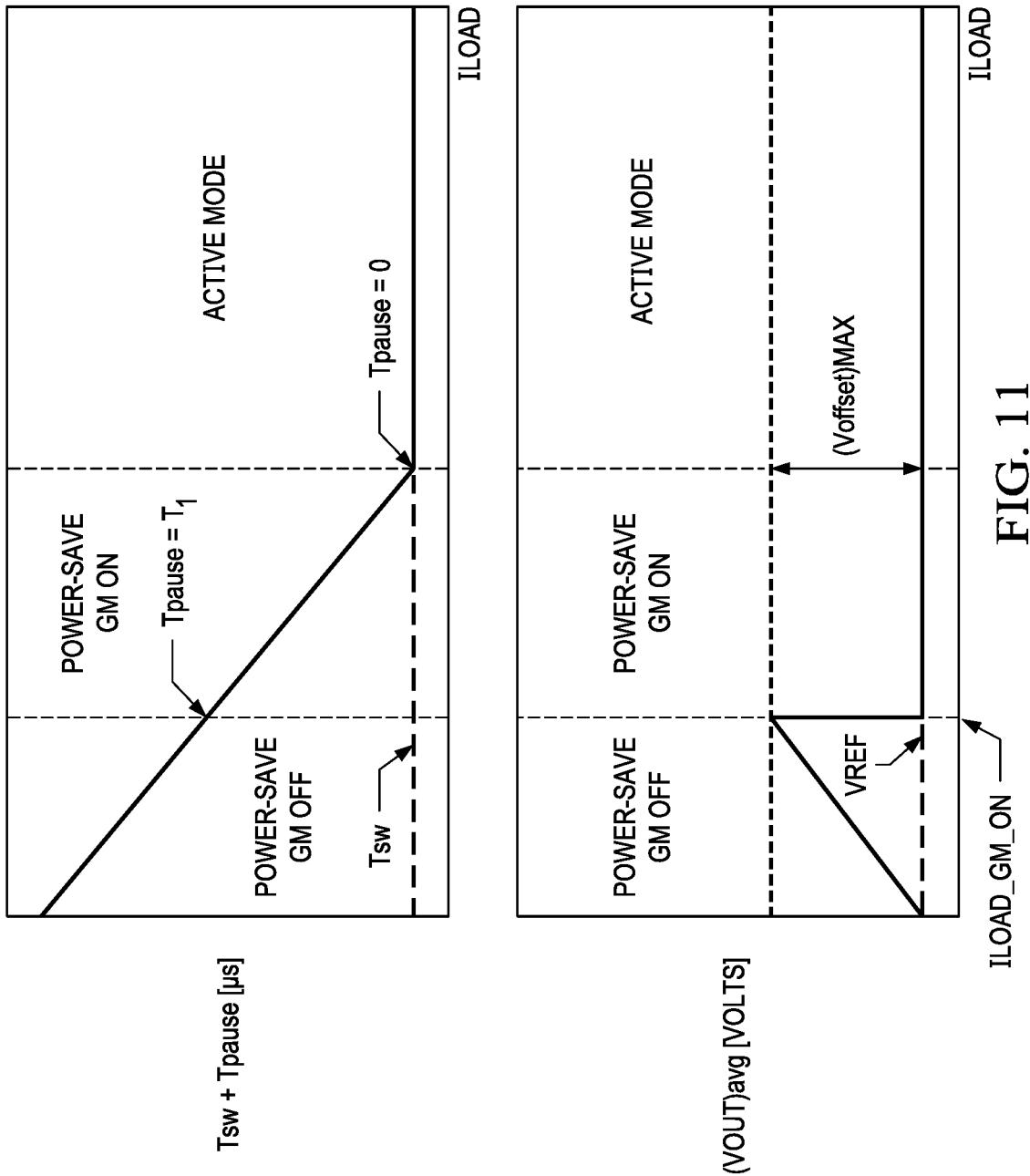
FIG. 11 is a graph showing average VOUT versus ILOAD characteristic of the ultra-low Iq buck converter topology of FIG. 9 or 10.

FIG. 9 and FIG. 10 show two examples of the disclosed idea that allows the power down of the error amplifier at light loads in power-save mode (transitioning to deep power-save mode when the power-save mode lasts for more than a time threshold). In FIGS. 9 and 10, the error amplifier is a transconductance amplifier, Gm, that compares the output voltage VOUT against the internal reference VREF and corrects the regulation ramp offset. The correction is applied not at the positive input but at the negative input of the comparator, at node FB. By doing so, the turn off of the transconductance amplifier is possible since Rbias provides, at no cost in terms of Iq, an alternative bias voltage at node FB when the GM stage is decoupled, avoiding the voltage drift of the integrator node FB that leakage could cause during long power-save mode operation. An additional advantage of compensating ramp offset at FB node is that no additional compensation capacitor is used. Series connection Cac-Caux in FIG. 9 and Caux in FIG. 10 play the role of compensation capacitor as well.

Switch S3 decouples the transconductance amplifier, Gm, from node FB when the error amplifier function is disabled (GM_OFF=1). A simple and low-Iq method to control the switch S3 is by measuring the duration of PAUSE ($T_{PAUSE}$). If $(V_{OFFSET})_{MAX}$ is the absolute maximum offset that the system can tolerate, the equation that relates $V_{OFFSET}$ with $T_{PAUSE}$ can be used to define a fixed PAUSE duration, $T_1$, above which the ramp offset is below $(V_{OFFSET})_{MAX}$:

$$T_1 \approx \frac{T_{SW}}{2} \times \frac{V_{HYSTERESIS}}{(V_{OFFSET})_{MAX}}$$

If load current decreases such that PAUSE duration is longer than $T_1$, offset caused by the regulation ramp will be lower than $(V_{OFFSET})_{MAX}$ and transconductance amplifier can be disabled. In the same way, for higher load currents such as $T_{PAUSE} < T_1$, regulation ramp starts to add offset higher than (Voffset)max to the output voltage VOUT and the transconductance amplifier must be activated to correct for that error (see FIG. 11).

The corresponding load current at which the correction is needed can be derived from the previous equations:

$$I_{LOAD\_GM\_ON} \approx \frac{(V_{OFFSET})_{MAX}}{V_{HYSTERESIS}} \times I_{L\_PK}$$

Typical values for $I_{LOAD\_GM\_ON}$ are in the range of several milliamps. At load currents of several milliamps, the Iq of the transconductance amplifier has no impact in the system energy efficiency.

Figure 12:
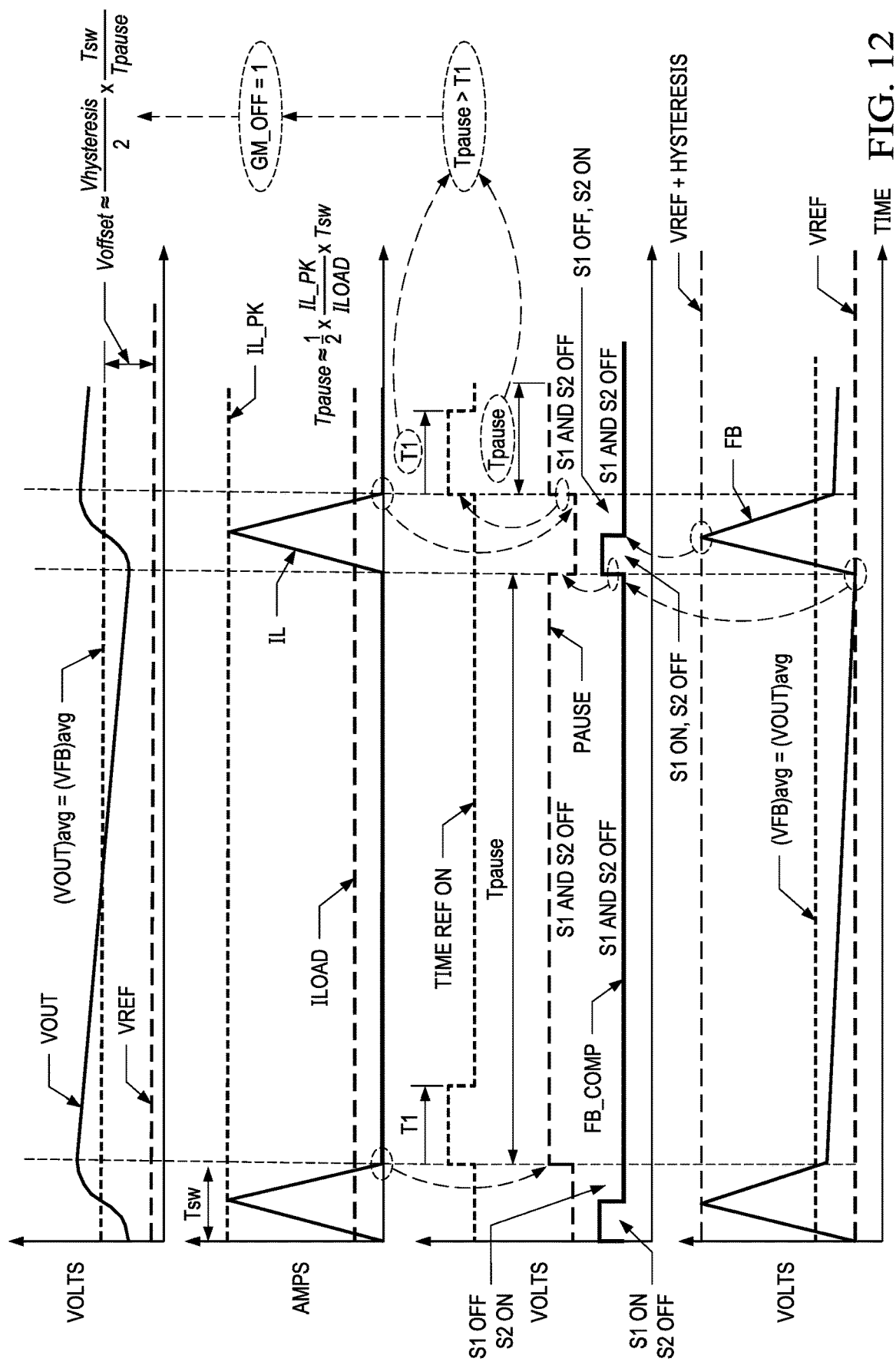
FIG. 12 is a timing diagram showing deep power-save mode waveforms for Tpause>T1 in accordance with the ultra-low Iq buck converter topology of FIG. 9 or 10.

FIG. 12 is a timing diagram showing deep power-save mode waveforms (e.g., when Tpause>T1) in accordance with some embodiments of the invention (e.g., the topology of FIG. 9 or 10). With Tpause>$T_1$, the transconductance amplifier is turned off (GM_OFF=1) and VOUT is regulated above VREF based on an offset ($V_{OFFSET}$) approximated as:

$$V_{OFFSET} \approx \frac{V_{HYSTERESIS}}{2} \times \frac{T_{SW}}{T_{PAUSE}}.$$

Figure 13:
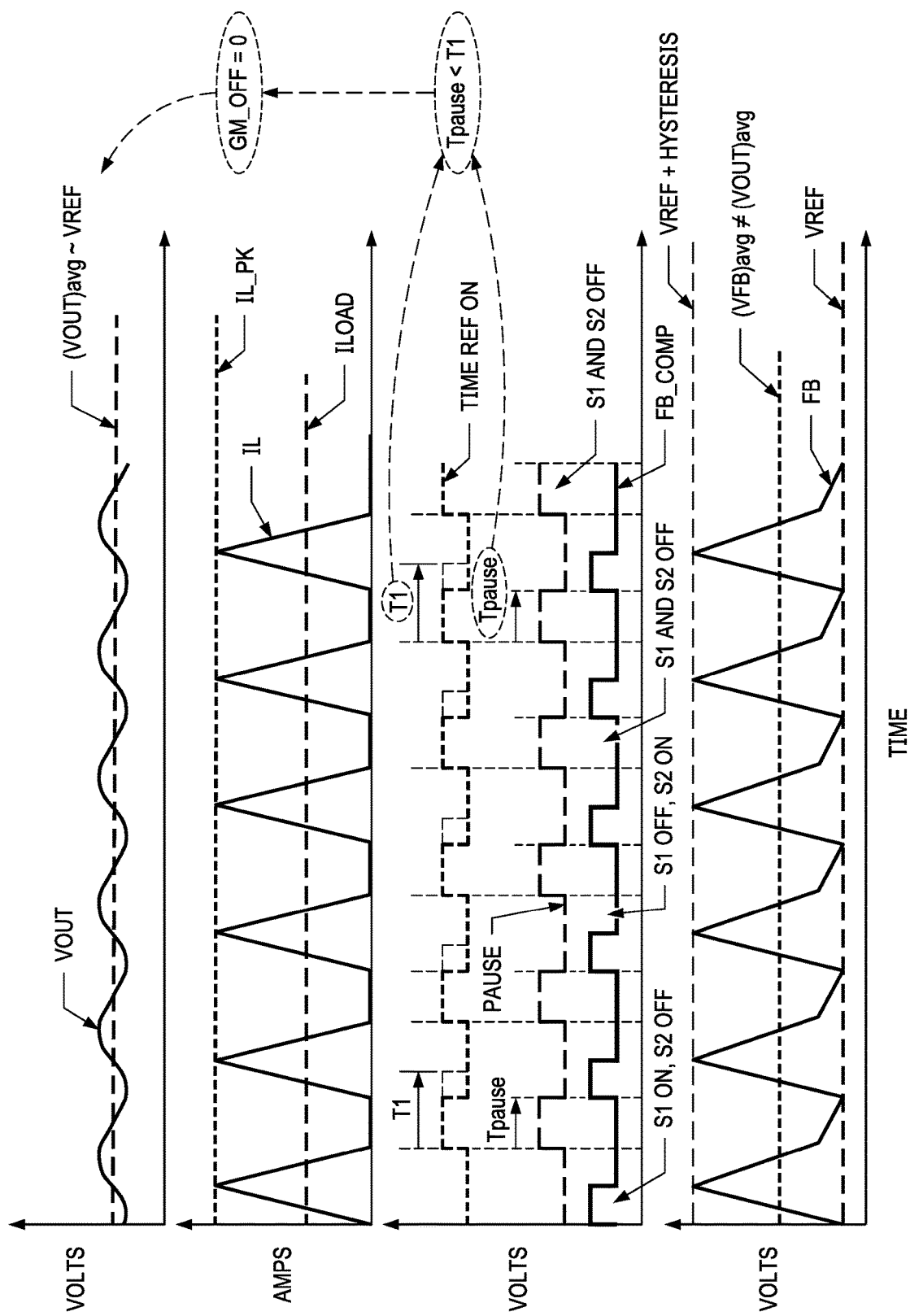
FIG. 13 is a timing diagram showing power-save mode waveforms for Tpause<T1 in accordance with the ultra-low Iq buck converter topology of FIG. 9 or 10.

FIG. 13 is a timing diagram showing power-save mode waveforms (Tpause<T1) in accordance with some embodiments of the invention (e.g., the topology of FIG. 9 or 10). With Tpause<T1, the transconductance amplifier stays on (GM_OFF=0) and VOUT is regulated to VREF.

As mentioned above, several modifications to the basic topology on FIG. 1 exist in the industry to reduce this switching frequency variation. The constant-on time switching regulator (COT) in FIG. 3 is one example. These hysteretic-base switching regulators with more stable switching frequency still suffer as well from reduced output voltage accuracy. The herein disclosed idea can be applied to those hysteretic-based switching regulators in order to compensate the output voltage offset without impacting their characteristic low Iq (see FIG. 14).

Figure 14:
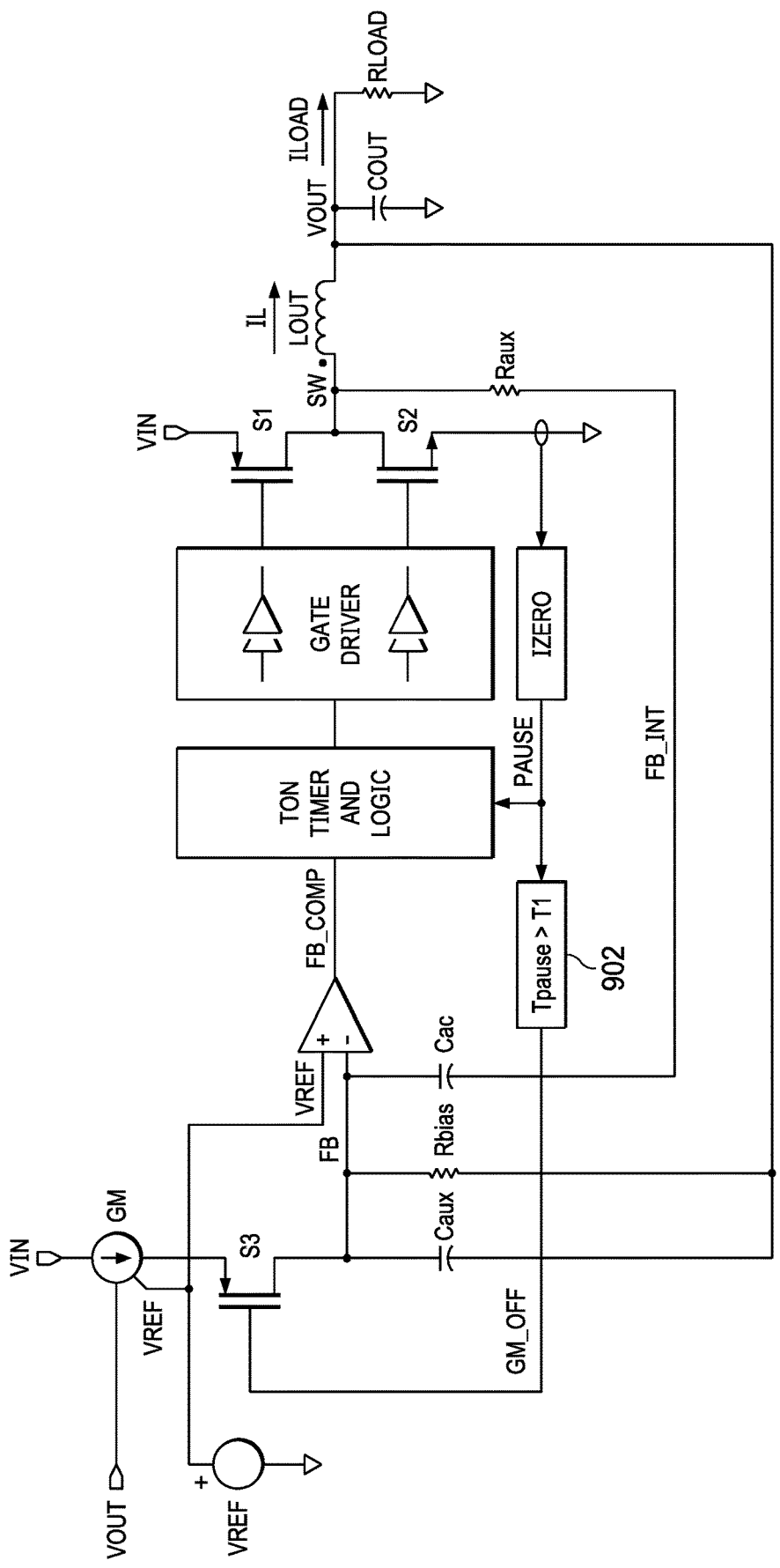
FIG. 14 is a schematic diagram showing a switchable error amplifier applied to a COT DC-DC switching converter topology.
Figure 15:
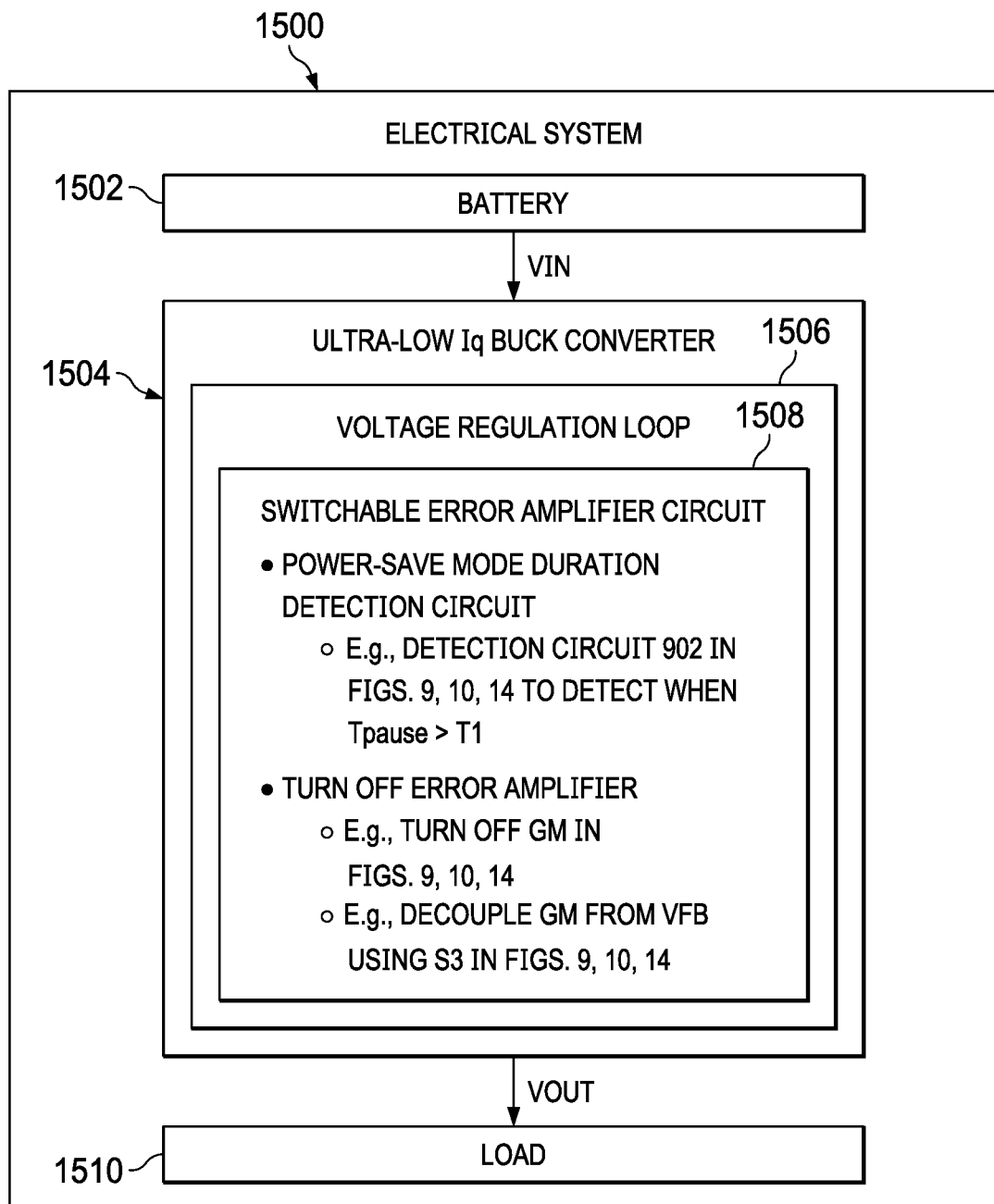
FIG. 15 is a block diagram showing an electrical system with a new ultra-low Iq buck converter topology.

FIG. 15 is a block diagram showing an electrical system 1500 with a new ultra-low Iq buck converter topology. The electrical system 500 in an example of a battery-powered electronic device, such as a smart phone, a wearable, a tablet computer, or other battery-powered electronic device. As shown, the electrical system 1500 includes a battery 1502 (e.g., different batteries provide voltages in the range of 5-40 Volts) coupled to an ultra-low Iq buck converter 1504, where the ultra-low Iq buck converter 1504 provides VOUT to a load 1510 based on VIN from the battery 1502 (or a regulation circuit between the battery 1502 and the ultra-low Iq buck converter 1504). The ultra-low Iq buck converter 1504 (an example of one of the ultra-low Iq buck converters in FIGS. 9, 10, and 14) includes a voltage regulation loop 1506 with a switchable error amplifier circuit 1508. For example, relating the ultra-low Iq buck converter 1504 of FIG. 15 to the ultra-low Iq buck converters in FIGS. 9, 10, and 14, the voltage regulation loop 1506 corresponds to the hysteretic comparator, the logic, the gate driver, S1, S2, the feedback loops (e.g., with Raux, Cac, Rbias, and/or Caux), the current sensor, and the inductor current reversal detector (IZERO) circuit in FIGS. 9, 10, and 14.

As shown, the switchable error amplifier circuit 1508 of FIG. 15 (represented as part of the voltage regulation loop 1506) includes a power-save mode duration detection circuit (e.g., the power-save mode duration detection circuit 902 in FIGS. 9, 10, and 14) to detect when a power-save mode duration is longer than a time threshold (e.g., to detect when $T_{PAUSE}$>$T_1$). The switchable error amplifier circuit 1508 also includes an error amplifier (e.g., the GM stage in FIGS. 9, 10, and 14) that is turned off in response to the power-save mode duration being longer than a time threshold. In other words, the deep power-save mode is initiated in response to the power-save mode duration being longer than a time threshold. In some examples, the error amplifier is also decoupled from the FB node during a deep power-save mode (e.g., by turning off S3 in FIGS. 9, 10, and 14).

In some examples, the switchable error amplifier circuit 1508 couples the GM stage to the feedback node (e.g., S3 is turned on) of the hysteretic comparator during an active mode and during a power-save mode, where VOUT is regulated to VREF. When duration of the power-save mode is detected to be greater than a time threshold (e.g., by the power-save mode duration detection circuit 902 detecting that $T_{PAUSE}$>T1), the deep power-save mode is initiated by turning S3 off, which decouples the error amplifier from the FB node of the hysteretic comparator. Also, the error amplifier is powered down during the deep power-save mode. With the error amplifier turned off, VOUT is regulated to an offset value ($V_{OFFSET}$) above VREF, where $$V_{OFFSET} \approx \frac{V_{HYSTERESIS}}{2} \times \frac{T_{SW}}{T_{PAUSE}}.$$

When the deep power save-mode ends (the PAUSE signal is turned off), S3 and the GM stage are turned on again to resume active mode regulation of VOUT.

With the switchable error amplifier circuit 1508, the GM stage is switched off during a deep power-save mode with the goal of reducing quiescent current. Additionally, with no GM stage during the deep power-save mode, there is no integration effect and therefore no delay in switching converter response related to the integration of the output voltage ripple. No delay contribution from integration during the deep power-save mode enhances system transient response. Another possibility would be to maintain transient performance and to use the additional delay margin to reduce quiescent current of hysteretic comparator in the deep power-save mode, helping to achieve the goal of reducing system quiescent current.

In some examples, a voltage regulation loop (e.g., the voltage regulation loop 1506 in FIG. 15, or corresponding components in FIGS. 9, 10, and 14) includes a switchable error amplifier circuit (e.g., the switchable error amplifier circuit 1508 in FIG. 15, corresponding components in FIGS. 9, 10, and 14). The switchable error amplifier circuit includes an error amplifier (e.g., the GM stage in FIGS. 9, 10, and 14) that is turned on during an active mode and during a power-save mode. During a deep power-save mode, the error amplifier is turned off. Also, the error amplifier is coupled to the FB node during an active mode and during a power-save mode. During a deep power-save mode, the error amplifier is decoupled from the FB node.

Also, the switchable error amplifier circuit comprises a detection circuit (e.g., the power-save mode duration detection circuit 902 in FIGS. 9, 10, and 14) configured to detect when the power-save mode lasts for more than a time threshold. In some examples, the detection circuit is configured to assert a control signal in response to detecting that a pause signal of the ultra-low Iq buck converter is asserted for more than the time threshold used by the detection circuit.

In some examples, the voltage regulation loop for an ultra-low Iq buck converter comprises a hysteretic comparator with a FB node, where the switchable error amplifier circuit comprises a switch (e.g., S3 in FIGS. 9, 10, and 14) between the error amplifier (e.g., the GM stage in FIGS. 9, 10, and 14) and the FB node. When the detection circuit asserts a control signal indicating a power-save mode duration is greater than a time threshold (e.g., when a pause signal duration is greater than the time threshold), the switch (e.g., S3) is turned off. Also, the error amplifier is powered down during the power-save mode. In some examples, the error amplifier is a transconductance stage with VOUT and VREF as inputs. In operation, the voltage regulation loop is configured to regulate VOUT around VREF when the error amplifier is turned on. When the error amplifier is turned off, the voltage regulation loop is configured to regulate VOUT around VREF plus an offset.

In some examples, the voltage regulation loop also includes a first feedback loop between a switch node of the ultra-low Iq buck converter and a FB node of a hysteretic comparator, where the first feedback loop includes a first resistor (e.g., Raux in FIG. 9) and a first capacitor (e.g., Cac in FIG. 9). The voltage regulation loop also includes a second feedback loop between an output node of the ultra-low Iq buck converter and the FB node of the hysteretic comparator, where the second feedback loop includes the first capacitor (e.g., Cac in FIG. 9) and a second capacitor (e.g., Caux in FIG. 9). The voltage regulation loop also includes a third feedback loop between an output node of the ultra-low Iq buck converter and the FB node of the hysteretic comparator, where the third feedback loop includes a second resistor (e.g., Rbias in FIG. 9).

In other examples, the voltage regulation loop further comprises a first feedback loop between a switch node of the ultra-low Iq buck converter and a FB node of a hysteretic comparator, where the first feedback loop includes a first resistor (e.g., Raux in FIGS. 10 and 14) and a first capacitor (e.g., Cac in FIGS. 10 and 14). The voltage regulation loop also includes a second feedback loop between an output node of the ultra-low Iq buck converter and the FB node of the hysteretic comparator, where the second feedback loop includes a second resistor (e.g., Rbias in FIGS. 10 and 14). The voltage regulation loop also includes a third feedback loop between an output node of the ultra-low Iq buck converter and the FB node of the hysteretic comparator, where the third feedback loop includes a second capacitor (e.g., Caux in FIGS. 10 and 14). Also, in some examples, the voltage regulation loop is configured to perform constant-on time (COT) switching regulation (e.g., using the TON timer and logic in FIG. 14).

In some examples, a switching converter device (e.g., the ultra-low Iq buck converters of FIGS. 9, 10, 14, or the ultra-low Iq buck converter 1504 of FIG. 15) includes a voltage regulation loop having a VIN node, a VOUT node, a VREF node, and a hysteretic comparator coupled to the VREF node (see e.g., FIGS. 9, 10, and 14). The voltage regulation loop also includes on-time control logic (see e.g., logic in FIGS. 9 and 10, or TON timer and logic in FIG. 14) coupled to an output of the hysteretic comparator. The voltage regulation loop also includes a driver circuit (see e.g., gate driver in FIGS. 9, 10, and 14) coupled to an output of the on-time control logic. The voltage regulation loop also includes a high-side switch (e.g., S1 in FIGS. 9, 10, and 14) coupled between the VIN node and a switch node, where a control terminal of the high-side switch is coupled to the driver circuit. The voltage regulation loop also includes a low-side switch (e.g., S2 in FIGS. 9, 10, and 14) coupled between the switch node and a ground node, where a control terminal of the low-side switch is coupled to the driver circuit. The voltage regulation loop also includes an error amplifier (e.g., the GM stage in FIGS. 9, 10, and 14) coupled to the FB node of the hysteretic comparator via a transistor (e.g., S3 in FIGS. 9, 10, and 14). The voltage regulation loop also includes a detection circuit (e.g., the power-save mode duration detection circuit 902 in FIGS. 9, 10, and 14) coupled to a control terminal of the transistor.

In some examples, the detection circuit (e.g., the power-save mode duration detection circuit 902 in FIGS. 9, 10, and 14) is coupled to an inductor current reversal detector (e.g., IZERO in FIGS. 9, 10, and 14) configured assert a pause signal (e.g., PAUSE in FIGS. 9, 10, and 14). The detection circuit is configured to assert a control signal (e.g., GM_OFF in FIGS. 9, 10, and 14) to the control terminal of a transistor (e.g., S3 in FIGS. 9, 10, and 14) in response to detecting that a duration of the pause signal is greater than a time threshold (i.e., a deep power-save mode is initiated). Also, the error amplifier is turned off during the deep power-save mode as described herein.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The above discussion is meant to be illustrative of the principles and various embodiments of the present invention. Numerous variations and modifications will become apparent to those skilled in the art once the above disclosure is fully appreciated.

What is claimed is:
1. A system, comprising:
an ultra-low Iq buck converter having an input node and an output node;
a battery coupled to the input node of the ultra-low Iq buck converter;
a load coupled to the output node of the ultra-low Iq buck converter, in which the ultra-low Iq buck converter includes:
a power stage having an input, having a switching output, and having a switching transistor coupled between the switching output and a ground;
an inductor coupled between the switching output and the output node;
a voltage regulation loop including a hysteretic comparator, the hysteretic comparator having a non-inverting input coupled to a reference voltage node, having an inverting input coupled to a feedback node, and having an output coupled to the power stage input;
an error amplifier having an input coupled to the reference voltage node, having an input coupled to the output node, and having an output;

a transistor having a terminal coupled to the error amplifier output, having another terminal coupled to the feedback node, and having a control terminal; and a power-save mode duration detection circuit having a current sensing input coupled to between the switching transistor and the ground and having an output coupled to the control terminal of the transistor.

2. The system of claim 1, in which the power-save mode duration detection circuit is configured to detect when a power-save mode lasts for more than the time threshold.

3. The system of claim 2, in which the power-save mode duration detection circuit is configured to assert a control signal in response to detecting that a pause signal of the ultra-low Iq buck converter has been asserted for more than the time threshold.

4. The system of claim 3, in which the transistor is turned off when the control signal is asserted.

5. The system of claim 1, in which the error amplifier is a transconductance stage with an output voltage (VOUT) and a reference voltage (VREF) as inputs.

6. The system of claim 5, in which the voltage regulation loop is configured to regulate VOUT around VREF when the error amplifier is turned on, and the voltage regulation loop is configured to regulate VOUT around VREF plus an offset when the error amplifier is turned off.

7. The system of claim 1, in which the voltage regulation loop includes:
    a first feedback loop between a switch node of the ultra-low Iq buck converter and the feedback node, the first feedback loop including a first resistor and a first capacitor;
    a second feedback loop between the output node of the ultra-low Iq buck converter and the feedback node, the second feedback loop including the first capacitor and a second capacitor;
    a third feedback loop between the output node of the ultra-low Iq buck converter and the feedback node, the third feedback loop including a second resistor.

8. The system of claim 1, in which the voltage regulation loop includes:
    a first feedback loop between a switch node of the ultra-low Iq buck converter and the feedback node, the first feedback loop including a first resistor and a first capacitor;
    a second feedback loop between the output node of the ultra-low Iq buck converter and the feedback node, the second feedback loop including a second resistor;
    a third feedback loop between the output node of the ultra-low Iq buck converter and the feedback node, the third feedback loop including a second capacitor.

9. The system of claim 1, in which the voltage regulation loop is configured to perform constant-on time (COT) switching regulation.

10. A switching converter device, comprising:
    a voltage regulation loop having:
        an input voltage (VIN) node;
        an output voltage (VOUT) node;
        a reference voltage (VREF) node;
        a hysteretic comparator having a non-inverting input coupled to the VREF node, having an inverting input coupled to a feedback node, and having an output;
        on-time control logic coupled to the output of the hysteretic comparator and having an output;
        a driver circuit having an input coupled to the output of the on-time control logic, having a high side output, and having a low side output; and
        a high-side switch coupled between the VIN node and a switch node, the high-side switch having a control terminal coupled to the high side output;
        a low-side switch coupled between the switch node and a ground node, the low-side switch having a control terminal coupled to the low side output;
        an error amplifier having a first input coupled to the reference voltage node, having a second input coupled to the output voltage node, and having an output;
        a transistor having a terminal coupled to the error amplifier output, having another terminal coupled to the feedback node, and having a control terminal; and
        a power-save mode duration detection circuit having an input coupled to the low-side switch and having an output coupled to the control terminal of the transistor.

11. The switching converter device of claim 10, in which the power-save mode duration detection circuit is coupled to an inductor current reversal detector configured to assert a pause signal, and the power-save mode duration detection circuit is configured to assert a control signal to the control terminal of the transistor in response to detecting that a duration of the pause signal is greater than a time threshold.

12. The switching converter device of claim 10, in which the error amplifier is a transconductance stage.

13. The switching converter device of claim 10, in which the voltage regulation loop is configured to regulate a voltage on the output voltage node around a reference voltage on the reference voltage node when the error amplifier is turned on, and the voltage regulation loop is configured to regulate a voltage on the output voltage node around a reference voltage on the reference voltage node plus an offset when the error amplifier is turned off.

14. The switching converter device of claim 10, in which the voltage regulation loop includes:
    a first feedback loop between the switch node and the feedback node, the first feedback loop including a first resistor and a first capacitor;
    a second feedback loop between the output node of the switching converter device and the feedback node, the second feedback loop including the first capacitor and a second capacitor;
    a third feedback loop between the output node of the switching converter device and the feedback node, the third feedback loop including a second resistor.

15. The switching converter device of claim 10, in which the voltage regulation loop includes:
    a first feedback loop between the switch node and the feedback node, the first feedback loop including a first resistor and a first capacitor;
    a second feedback loop between the output node of the switching converter device and the feedback node, the second feedback loop including a second resistor;
    a third feedback loop between an output node of the switching converter device and the feedback node the third feedback loop including a second capacitor.

16. The switching converter device of claim 10, in which the on-time control logic is configured to perform constant-on time (COT) switching regulation.

17. A switching converter circuit, comprising:
    a hysteretic comparator having a non-inverting input coupled to a reference voltage node and having an inverting input coupled to a feedback node, the feedback node being coupled to a switching voltage node and to an output voltage node; and
    a switchable error amplifier circuit including;

an error amplifier having an input coupled to the reference voltage node, having an input coupled to the output voltage node, and having an output; and a switch coupled to the error amplifier output and coupled to the feedback node, the switch coupling the error amplifier to the feedback node during a power-save mode and the switch decoupling the error amplifier from the feedback node during a deep power-save mode initiated in response to a duration of the power-save mode being greater than a time threshold.

18. The switching converter circuit of claim 17, in which the error amplifier is powered off during the deep power-save mode.

19. The switching converter circuit of claim 17, in which the switchable error amplifier circuit includes:

a power-save mode duration detection circuit configured to assert a control signal to the switch in response to detecting that a duration of a pause signal for the switching converter circuit is greater than the time threshold.

20. The switching converter circuit of claim 17, in which the error amplifier is a transconductance, the switchable error amplifier circuit is configured to regulate a voltage on the output voltage node around a reference voltage on the reference voltage node when the error amplifier is turned on, and the switchable error amplifier circuit is configured to regulate a voltage on the output voltage node around a reference voltage on the reference voltage node plus an offset when the error amplifier is turned off.

21. The switching converter circuit of claim 17 in which the feedback node is coupled to the switching voltage node through a resistor and to the output voltage node trough a capacitor.

* * * * *